(12) United States Patent
Ehsani et al.

(10) Patent No.: US 9,614,690 B2
(45) Date of Patent: *Apr. 4, 2017

(54) SMART HOME AUTOMATION SYSTEMS AND METHODS

(71) Applicant: NANT HOLDINGS IP, LLC, Culver City, CA (US)

(72) Inventors: Farzad Ehsani, Sunnyvale, CA (US); Silke Maren Witt-Ehsani, Sunnyvale, CA (US); Walter Rolandi, Columbia, SC (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,934

(22) Filed: Nov. 23, 2015

(65) Prior Publication Data

US 2016/0080165 A1    Mar. 17, 2016

Related U.S. Application Data

(63) Continuation of application No. 14/049,158, filed on Oct. 8, 2013, now Pat. No. 9,230,560.

(Continued)

(51) Int. Cl.
*G06F 17/27* (2006.01)
*H04L 12/28* (2006.01)
(Continued)

(52) U.S. Cl.
CPC ............ *H04L 12/282* (2013.01); *G05B 15/02* (2013.01); *G06F 3/167* (2013.01); *G06F 17/279* (2013.01);
(Continued)

(58) Field of Classification Search
CPC .......... G06F 17/20; G06F 17/21; G06F 17/27; G06F 17/2705; G06F 17/2735;
(Continued)

(56) References Cited

U.S. PATENT DOCUMENTS 613,809 A    11/1898 Telsa
4,520,576 A    6/1985 Vander Molen
(Continued)

OTHER PUBLICATIONS

Renger, Bernard; Chang, Harry; Feng, Junlan; Dan, Ovidiu; Barbosa, Luciano; AT&T Labs—Research; "VoiSTV: Voice-Enabled Social TV", WWW2011, Hyderabad, India, Mar. 28-Apr. 1, 2011.

*Primary Examiner* — Qi Han
(74) *Attorney, Agent, or Firm* — Stetina Brunda Garred & Brucker

(57) ABSTRACT

A smart home interaction system is presented. It is built on a multi-modal, multithreaded conversational dialog engine. The system provides a natural language user interface for the control of household devices, appliances or household functionality. The smart home automation agent can receive input from users through sensing devices such as a smart phone, a tablet computer or a laptop computer. Users interact with the system from within the household or from remote locations. The smart home system can receive input from sensors or any other machines with which it is interfaced. The system employs interaction guide rules for processing reaction to both user and sensor input and driving the conversational interactions that result from such input. The system adaptively learns based on both user and sensor input and can learn the preferences and practices of its users.

19 Claims, 5 Drawing Sheets

Related U.S. Application Data

(60) Provisional application No. 61/711,101, filed on Oct. 8, 2012.

(51) Int. Cl.
*G10L 21/06* (2013.01)
*G06F 3/16* (2006.01)
*G10L 15/22* (2006.01)
*G05B 15/02* (2006.01)
*H04M 1/725* (2006.01)

(52) U.S. Cl.
CPC .......... *G06F 17/2735* (2013.01); *G10L 15/22* (2013.01); *G10L 21/06* (2013.01); *H04L 12/281* (2013.01); *H04M 1/72533* (2013.01); *G05B 2219/2642* (2013.01); *G10L 2015/223* (2013.01); *G10L 2015/226* (2013.01); *H04L 2012/285* (2013.01)

(58) Field of Classification Search
CPC .............. G06F 17/274; G06F 17/2765; G06F 17/2785; G06F 17/279; G06F 17/28; G06F 17/2809; G06F 17/2872; G06F 17/30

USPC .......... 704/10, 1, 2, 3, 7, 9, 270, 270.1, 275
See application file for complete search history.

(56) References Cited

U.S. PATENT DOCUMENTS

| | | |
|---|---|---|
| 4,882,681 A | 11/1989 | Brotz |
| 4,885,681 A | 12/1989 | Umeno et al. |
| 5,818,733 A | 10/1998 | Hyuga |
| 5,982,853 A | 11/1999 | Liebermann |
| 6,397,267 B1 | 5/2002 | Chong, Jr. |
| 6,535,854 B2 | 3/2003 | Buchner et al. |
| 6,633,235 B1 | 10/2003 | Hsu et al. |
| 6,756,998 B1 | 6/2004 | Bilger |
| 6,988,070 B2 | 1/2006 | Kawasaki et al. |
| 7,464,035 B2 | 12/2008 | Funk et al. |
| 8,165,867 B1 | 4/2012 | Fish |
| 8,301,436 B2 | 10/2012 | Wang |
| 2002/0069063 A1 | 6/2002 | Buchner et al. |
| 2004/0083092 A1 | 4/2004 | Valles |
| 2007/0043687 A1 | 2/2007 | Bodart et al. |
| 2010/0332234 A1 | 12/2010 | Agapi et al. |
| 2011/0069822 A1 | 3/2011 | Jan et al. |

SMART HOME AUTOMATION SYSTEMS AND METHODS

This application is a continuation of prior U.S. application Ser. No. 14/049,158 filed Oct. 8, 2013, now issued as U.S. Pat. No. 9,230,560, which claims the benefit of priority to U.S. provisional application having Ser. No. 61/711,101, filed on Oct. 8, 2012. This and all other referenced extrinsic materials are incorporated herein by reference in their entirety.

FIELD OF THE INVENTION

The field of the invention is natural language processing and interaction technologies.

BACKGROUND

The following description includes information that may be useful in understanding the present invention. It is not an admission that any of the information provided herein is prior art or relevant to the presently claimed invention, or that any publication specifically or implicitly referenced is prior art.

Home automation involves controlling various devices or systems that can be present in homes. Home automation technologies can allow for local and/or remote control of home automation devices. Remote control of devices has an extensive history. For example, U.S. Pat. No. 613,809 to Nikola Tesla, titled "Method of and apparatus for controlling mechanism of moving vessels and vehicle", issued over 100 years ago on Nov. 8, 1898. The work is cited primarily to establish the long history of the remote control of a machine. The work does not describe an interaction system that receives input signals from a multi-modal interface. Nor does the work describe the conversion of such input signals into queries using a location-specific normalized vocabulary.

The history of home automation has been characterized by an absence of device interface standards, high costs, and awkward user interfaces. Until recently, computer based home automation was largely for hobbyists or the very wealthy. Universal presence of heating, ventilation, and air conditioning (HVAC) systems, labor saving appliances, refrigeration appliances, telecommunication devices, home entertainment systems or components, personal computers and the Internet has caused an increase in the number of mechanical and electrical devices that are required to control these various machines. User interfaces for controlling such devices remain primitive. For example, U.S. Pat. No. 6,756,998 to Bilger titled "User interface and method for home automation system", filed on Oct. 19, 2000, requires a very complex user interface far outside the scope of unsophisticated users. In addition, Bilger fails to describe use of a multi-modal interface and the conversion of input signals into queries using a location specific normalized vocabulary. Ideally, home automation interfaces would allow users to interact with the system in a seamless fashion.

Some effort has been directed to reducing the complexity of home automation interfaces. One example includes using a telephone to control home automation devices as described by U.S. Pat. No. 7,464,035 to Funk et al. titled "Voice control of home automation systems via telephone", filed Jul. 24, 2002. Another example that focuses on voice control of electrical appliances in a home is U.S. Pat. No. 6,988,070 to Kawasaki et al. titled "Voice control system for operating home electrical appliances", filed on May 11, 2001. Additional effort has been directed to controlling televisions through a voice operated remote control as described in "VoiSTV: Voice-Enabled Social TV", Bernard Renger, Harry Chang, Junlan Feng, Luciano Barbosa, AT&T Labs—Research; Ovidiu Dan; Lehigh University. While advantageous in some aspects, none of these cited works entail the conversion of input signals into queries using a location-specific normalized vocabulary.

Further progress is made toward controlling household devices through a conversational user interface as discussed in U.S. Pat. No. 4,520,576 to Vander Molen titled "Conversational voice command control system for home appliance", filed on Sep. 6, 1983. Similar work using speech recognition to control networked devices in the home include U.S. Pat. No. 6,535,854 to Buchner et al. titled "Speech recognition control of remotely controllable devices in a home network environment", filed Oct. 19, 1998. However, these works also fail to describe the conversion of input signals into queries using a location specific normalized vocabulary.

Yet further progress toward natural user interfaces includes use of a virtual assistant as disclosed in U.S. Patent application publication 2007/0043687 to Bodart et. al titled "Virtual assistant", filed Aug. 19, 2005. While this work claims the use of a natural language interface, it fails to describe the conversion of input signals into queries using a location specific normalized vocabulary.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

There remains a significant need for improved home automation systems, methods, and technologies. Specifically, most prior efforts entail complex and difficult-to-use or learn user interfaces. Some efforts to simplify and improve user interfaces have focused on the use of speech recognition technologies. Yet all efforts have failed to deliver the benefits of an interaction system that receives input signals from a multi-modal interface. In addition, prior efforts have failed to describe the conversion of such input signals into queries using a location specific normalized vocabulary.

Thus, there is still a need for improved home automation systems, methods, and technologies.

SUMMARY OF THE INVENTION

The inventive subject matter provides systems and methods in which one can leverage an interaction system to control an environment's devices, especially devices within a home. Interaction systems can include a device interface, a multi-modal interface, and a multi-modal dialog interaction engine. The multi-modal dialog interaction engine obtains input signals from the multi-modal interface (e.g., cell phone, browser, game console, sensors, etc.) where the signals can represent different modalities of input (e.g., voice, images, gestures, touch, sensor data, etc.). The interaction engine is configured to convert the input signals into a query by mapping, tagging, and/or parsing the inputs to semantic meaning (or semantic concepts) using a domain specific vocabulary library and/or a location specific vocabulary, possibly specific to a home. The query is a digital representation of the semantic meaning and can be submitted to an indexed interaction guide library database to retrieve one or more interaction rules. The interaction rules comprise one or more possible interactions considered relevant to the environment or to the user's interactions with the interaction system. Further, the interaction engine generates one or more device commands targeting devices within the local environment based on the returned interaction rules. The interaction engine can configure the local environment's devices to execute the commands. Additionally, the interaction engine can present a response to the user's input signals and related to the device commands to the user, perhaps through the dialog interface.

The claimed inventive subject matter described herein provides a more comprehensive and unique advancement of technologies and methodologies in the field of home automation systems, and represents a substantial improvement in the field. Specifically, the claimed inventions(s) provide more accurate and more fluid interaction technologies that facilitate human-to-device interaction. Additionally, the claimed invention solves the problem of managing multiple devices that have different functionality but are related by location and environment. The claimed invention represents a significant advancement in the multi-modal control of multiple devices using location specific natural language and other easy-to-learn and use modalities.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
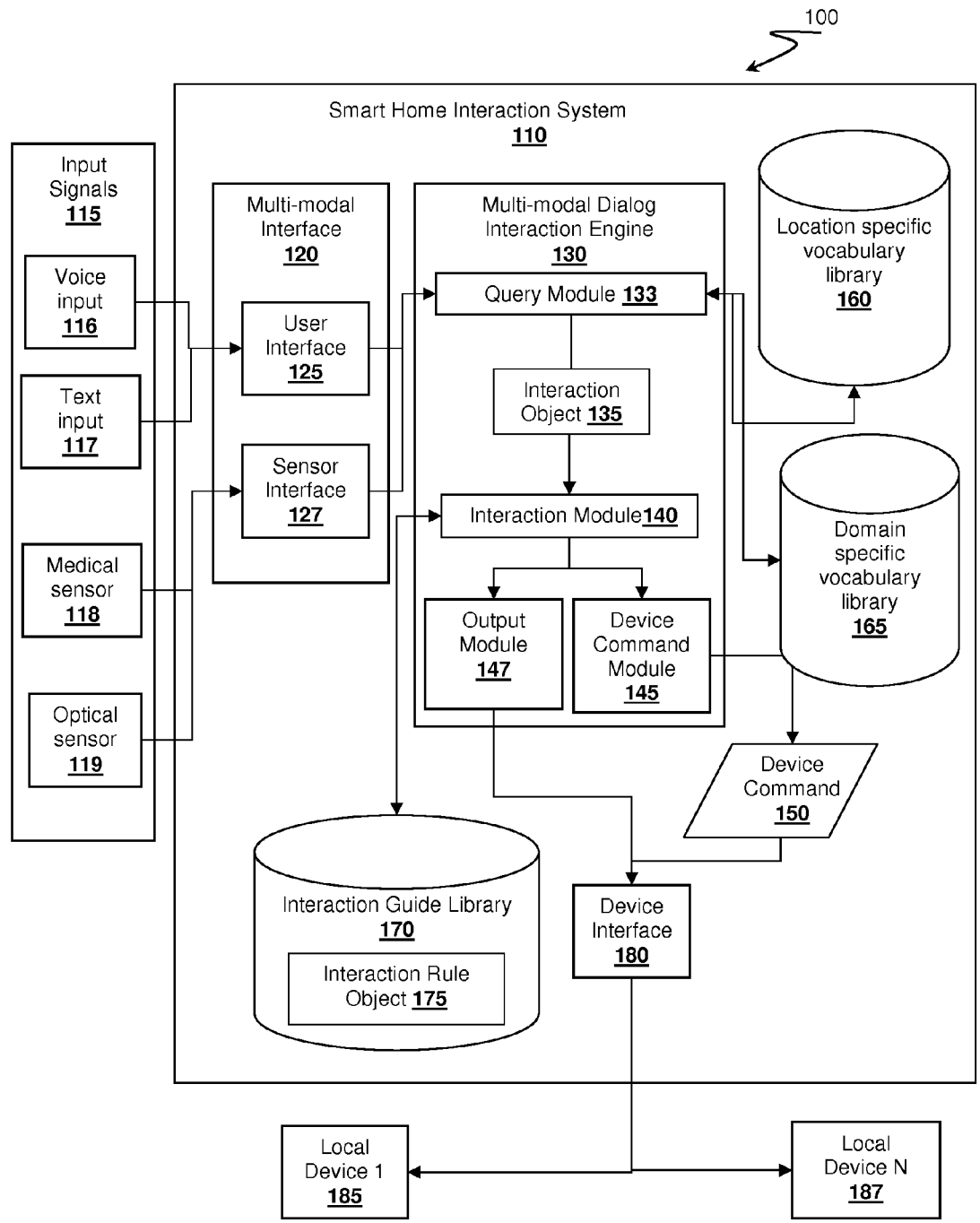
FIG. 1 is a schematic overview of a multi-modal smart home interaction system.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed systems, methods, and techniques provide many advantageous technical effects, including converting natural language inputs into device commands that configure one or more devices to operate according to commands within the natural language inputs. The smart home interaction system includes an engine that drives all human-machine interactions in the home. The smart home interaction systems contemplated herein represent significant and unique improvements in the field of home automation.

An interaction systems described herein can provide a single point of control for a plurality of machines or devices across a plurality of user interfaces. Contemplated interaction systems use automatic speech recognition and natural language understanding to intelligently react to sensor input and provide human-like assistance in managing household machines and functions. The inventive subject matter entails the use of a multi-modal conversational dialog interaction engine, automatic speech recognition, natural language understanding supported by interaction guide rules for processing inputs from both users and sensors. The system serves to control any number of properly instrumented household machines. It is also capable of adaptive learning based on both user and sensor input.

In one aspect of some embodiments, the interaction system is a smart home automation agent (or system) that allows users to communicate with home devices and systems to control and manage home automation. Contemplated agents can be made up of a multi-modal conversational dialog engine and preferably uses automatic speech recognition and natural language understanding to process spoken, gestural and textual input from human users. The multi-modal interaction engine communicatively couples with databases, the internet and other systems over a network (e.g., LAN, WAN, Internet, etc.). The agent is also capable of processing input from computing devices, telecommunication devices, sensors and other devices, appliances or functions typically found in a household.

The agent's ability to intelligently respond to these various inputs in a human-like manner is supported by a dialog engine combined with inference rules and interaction guide rules for processing reactions to both user and sensor input. This means that both the user and the smart agent can initiate interactions. The smart agent might initiate an interaction for example when a sensor detects that outside temperature is approaching freezing. The agent has predefined action rules (stored in an interaction guide library/database) that indicate what actions it should take when this occurs. For example, the agent knows to turn on a garage heater when the temperature is below 32 Fahrenheit. The agent initiates a conversation with the user, informing the user of its action and asking, for example, if it should take any additional precautions:

Agent: Sensors indicate the current temperature outside is 30 degrees. I have set the garage heater at 45 degrees and turned it on. Is there anything else?

User: Yes. What is the current setting for the master bedroom?

Agent: It is set at 74.

User: Ok, leave it at 74 until nine PM after which drop it to 64 until 6:30 AM.

Keep the rest of the house at 66 all night.

Agent: All right.

FIG. 1 presents an overview of a smart home interaction system 110 where a user interacts with the system 110 by providing input signals 115. The multi-modal dialog interaction engine 130 can receive input signals 115 through one or more multi-modal interfaces 120 where the input signals 115 possibly represent different modalities of input (e.g., inputs 116-119). In embodiments where the multi-modal interface 120 comprises a user interface 125, the interface can include a smart phone, a wall panel, a hidden microphone, a game console, a tablet, a vehicle, a computer, a server, or other form of input device. The modality of the input signals depends on the nature of the input device and can cover a broad spectrum of modalities. For example, the input signals can represent one or more modalities including text, audio, speech, a recognized user reaction, a recognized emotion, a gesture, a touch or tactile interaction, an image, a video, biometrics, or other data modalities. One should appreciate that the user interface 125 can also include devices remote from the specific location. For example, the user could interact with their home while traveling via a telephone, a web browser, or an app on their cell phone or tablet.

One should appreciate that the multi-modal interface 120 can also include a sensor interface 127 through which the multi-modal dialog interaction engine can obtain sensor data as input signals 115. The sensor interface 127 can also include a broad spectrum of connectors or protocols similar to the device interface 180. Such sensor interfaces 127 can be configured to interact with different types of sensors associated with a location. Example sensors include a camera, a thermostat, a precipitation sensor, a medical sensor, a microphone, a proximity sensor, an accelerometer, an optical sensor, weather sensors, pressure sensors, power meters, phone or cable lines, or other sensors.

Note that input signals can be divided into passive and active input signals and that the system discussed here can process both types of signals individually and separately or together in combination. Active signals are those where the user directly addresses the smart home interaction system possibly using a system name such as "home sweet home." In contrast to this, passive signals are signals that the system acquires by monitoring the house via all enabled sensors, (e.g., data are being retrieved at periodic time intervals). An example of passive signals would be when the smart home system is configured to detect words spoken from one user to another such as "Mom, I'm cold." In other words, the home system is in an eavesdropping mode. See the co-owned patent application "Interactive spoken dialogue interface for collection of Structured Data", Ser. No. 13/917,519 for a detailed discussion of the eavesdropping mode for such a multi-modal interaction system. If the system is in this eavesdropping mode, the multi-modal interface will have the task of continually monitoring all configured sensors and passing the retrieved input data to the interaction engine which has to convert the input to a query using the location-specific vocabulary as well as all configured domain vocabulary.

Another example of active and passive input signals is a combination of active and passive input signals. For example, a user could ask the question "What is the outside temperature?" This represents the active signal that the interaction engine will process, e.g., by identifying a matching interaction object (e.g., a semantic meaning) using a location specific vocabulary library and/or domain specific vocabulary library. The interaction engine will then match the interaction object with at least one interaction rule in the interaction guide library. Each interaction rule has a number of data associated with it that represent the interaction object's context. In the example of a weather inquiry, the interaction rule may include data such as the current outside temperature, which has its value continually updated. The location specific vocabulary library of the smart home automation system also has data about the home's inhabitants. Thus the following use case is possible where a child would say "Mom, I want to wear my red summer dress." This utterance would be processed as a passive signal and mapped to an interaction object (representing the semantic meaning of the utterance) using the location specific vocabulary library and the weather domain in the domain specific vocabulary library. The smart home system will then match the interaction object to the interaction rule dress_request in the interaction guide library. For example:

Dress_request.type='summer clothing'

Dress_request.by='Child1'

Outside_temperature='50 F'

With both the dress_request and temperature information, the processing of the query 'what's the outside temperature' might result in a response generation "It is 50 degrees Fahrenheit and today's high will be 59 Fahrenheit. I recommend wearing warm clothing."

Note that such a combination of active and passive signals enables the smart home system to be intuitive and responsive—the user does not have to spell out all details of the query but rather the system can anticipate the user's needs.

Note also that the above example illustrates how the usage of location specific normalized vocabulary provides more relevant queries and device commands than a multi-modal interaction engine that would not have such location specific knowledge in addition to domain-specific knowledge.

Interface 125 and 127 are configured to process the input signals and convert them to a uniform machine-readable format. The processed input signals 115 are then sent to the multi-modal dialog interaction engine 130. This multi-modal interaction engine consists of a query model 133, a device command module 145 and an output module 147. The query module converts the processed input signal 115 to a query by mapping input signal 115 with an interaction object 135 using the location specific normalized vocabulary library 160. The interaction object 135 is a digital representation of a semantic meaning of input signal 115. Next, an interaction rule object 175 is retrieved from the interaction guide library 170 by submitting the query (e.g., interaction object 135) to library 170 using the interaction module 140.

The multi-modal dialog interaction engine 130 analyzes the signals 115 in order to convert the signals 115 using the query module 133 into an interaction object 135 according to a normalized vocabulary associated with a location specific vocabulary 160. Such an approach is considered advantageous because the system can be responsive to a known context without incurring ambiguity. The location specific normalized vocabulary 160 can be further used as an indexing scheme in the interaction guide library 170 for storing interaction rule objects 175. In addition to the location-specific vocabulary library, system 100 also comprises one or more domain specific vocabulary libraries 165. While the location-specific vocabulary covers knowledge around the system's users, its location, etc., the domain vocabularies contain the vocabulary and phrases relevant to specific domains such as food, finance, home security or wellness.

The multi-modal dialog interaction engine 130 submits the interaction object 135 to the interaction guide library 170 to retrieve one or more interaction rule objects 175 that relate to the obtained inputs. The interaction rule objects 175 could reflect user requests, triggered actions based on changes in the environment as detected through sensor data, programmed interactions, or other forms of interactions.

The interaction rule objects 175 can include information on how to interact with devices 185 or 187 in response to the current circumstances. For example, if the thermostat should be adjusted, the interaction rule object 175 can be considered and serve as a template for adjusting a thermostat. The template can be populated based on parameters derived from the input signals or from an interaction object 165. The interaction rule object 175 includes one or more interaction rules outlining how the engine should interface with devices in support of the interaction. The rules can include device driver information, mapping from input signals to device protocols, error handling, or other forms of device interaction information. The multi-modal dialog interaction engine 130 can then generate one or more device commands 150 based on the interaction rule objects 175 and the rules contained therein where the command targets the required or optional devices in the interaction. The engine can then configure the target devices 185 or 187 to execute the commands.

Following this, the device command module generates a device command 150 while at the same time, the output module 137 assembles an output response. This output response is sent to the local device 185 or 187 depending on the details of the device command 150. More specifically, the smart home interaction system 110 from FIG. 1 can interact with one or more local devices 185 or 187 via a device interface. For example, as the interaction engine observes its environment or receives commands from a user, the interaction engine can provide device commands via a device interface 180 to the local devices. The device interface 180 can be comprised of different types of physical connectors or operate according to protocols suitable for the target devices. Example device interactions can be based on a serial interface (e.g., RS-232, RS-485, RS-422, etc.), an Ethernet interface, a LonWorks protocol interface, an X10 protocol interface, a wireless interface (e.g., Bluetooth, Zigbee, 802.11, 802.15, etc.), an HTTP server, a line-of-site interface (e.g., IrDA, etc.), or other types of interfaces.

In addition to configuring devices to execute commands, one should appreciate that the multi-modal dialog interaction engine 130 can configure one or more output devices 185 and 187, possibly those associated with the multi-modal interface 120, to seamlessly interact with the user in a conversational manner as discussed above and further described below. By offering users a seamless multi-modal interface 120 through which to interact with a local environment, especially within the home, the users obtain a sense of fulfillment to which they feel entitled, given the abilities of system.

In addition to the control of such devices 185 and 187, the smart home interaction system 110 can be asked to perform tasks not heretofore associated with home automation. For example, a user may ask the system 110 to open a web page, download a movie, record a show or order a pizza. The user may also ask the agent to use a search engine to locate a phone number and dial it, get directions and display them on a particular video screen, get a movie schedule or call a restaurant for reservations. These abilities far exceed the capacity of existing home automation products and are made possible by virtue of the system's modular design.

The interaction rule objects 175 play a role in conversational dialogs with a user. The smart home automation system 110 can run on a desktop computer or a portable device including but not limited to a smart phone, a tablet computer or laptop computer. For each home automation task, one or more domain specific libraries 165 and interaction guide library 170, any of which may require additional interactions with the user, sensors or other machines, are loaded into the system. These interaction guides 175 provide the schemas required for intelligent conversational dialog regarding the automation task at hand. For example, if the dialog topic was heating and air system control, the interaction object 165 would map to the heating and air system interaction rule objects 175 in the interaction guide library 170. Each type of home automation functionality represents an individual set of interaction rule objects 175 for the control of machines, devices, consumer electronics, or appliances contained in the home or the control or performance of various other tasks from the convenience of the home. A television control interaction guide provides an example for the former. A specialized interaction guide for ordering take-out food from restaurants provides an example of the latter.

Figure 2:
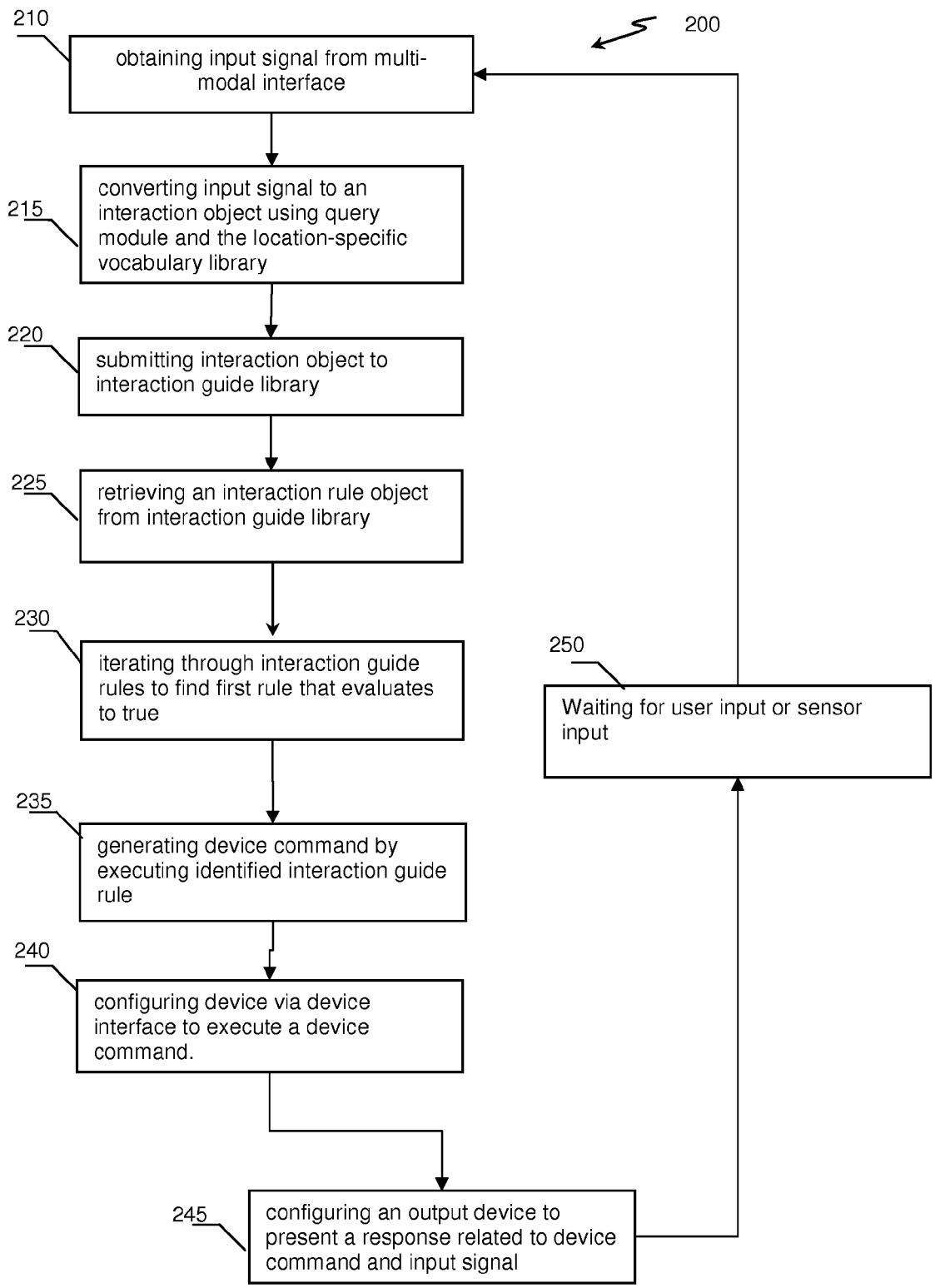
FIG. 2 illustrates a method of interacting with one or more devices.

FIG. 2 describes the method of processing input signals within the multi-modal dialog interaction engine 130 from FIG. 1. The process starts with obtaining one or more input signals from the multi-modal interface 210. The received input signal is converted to an interaction object by using the query module, which retrieves location specific vocabulary from the vocabulary library 215 that is specific to the input signal. The location specific vocabulary is specific to the characteristics and preferences of the home's inhabitants as well as the different input and output devices available. This location specific vocabulary enables local disambiguation and context clarification.

The resulting interaction object is then submitted to the interaction guide library 220 and in turn, an interaction rule object is retrieved in response 225. Once the correct interaction rule object has been determined for the given context and input signal, the multi-modal interaction dialog engine iterates through the rules of the active interaction rule object in order to find the first rule that evaluates to true 230. Each interaction rule contains instructions for generating a device command and thus in step 235 the appropriate device command is generated by the interaction rule that evaluates to true. The device command is then sent to configure the respective local device 240. Based on the same interaction guide rule, an output response is also generated and configured on the output device 245. Once the device command has been executed and the output response been presented to the device, the system goes into a waiting mode to receive the next user or sensor input 250.

Information from domain relevant libraries 165 is used by all the components to specialize the interface system to the domain. Data consisting of relevant terms and phrases are extracted from the libraries and used to create the language model for automatic speech recognition. Domain relevant libraries also provide information used to create probabilities, categories, and features for the natural language processing, natural language understanding and conversational dialog processing aspects of the system. There are accordingly separate and specialized modules to support each type of home automation functionality.

The domain is also constrained by the content of the location specific vocabulary library 160 that is also being loaded into the system. This constraint is used to improve automatic speech recognition and natural language understanding accuracy. For example, if the single current active interaction guide covers the domain of ordering food in a restaurant, then vocabulary and interaction objects related to asking for directions can be excluded from the automatic speech recognition and natural language understanding models. In dialog mode, the domain can be further restricted to material specifically relevant to the task that the user is attempting to complete. For example, in a home where the take-out food ordering interaction guide was present, a user standing in the kitchen may suddenly decide to have the smart home system order a pizza for home delivery. The dialog might take the form of:

User: I don't want to cook tonight. How about ordering me a pizza?
Agent: All right. Which take-out service should I use?
User: Franco's pizza.
Agent: Would you like your usual order?
User: Yes, a large cheese but also a smoked ham calzone.
Agent: Will that be all?
User: Please pay the rush order fee.
Agent: All right. You'd like a large cheese and a smoked ham calzone with rush delivery from Franco's Pizza. Is that correct?
User: That's right.
Agent: Shall I use your Amex card?
User: No use the Visa this time.
Agent: I will place the order now using your Visa account and let you know if any issues arise.

Each interaction rule object as well as each user can have priorities assigned to them. The user related priorities are stored with the location specific vocabulary while the interaction rule object priorities are stored in the header of an interaction rule object. A detailed discussion of the priority management between different topics, i.e. interaction rule objects can be found in the co-owned patent application "Multi-dimensional interaction and recall", Ser. No. 61/599, 054. In the invented matter discussed here, the priority calculation between interaction rule objects is extended to include the user priorities. The user priorities are utilized in cases when there are multiple interaction guide rules that evaluate to true but which are associated with different users. In that case the interaction guide rule that is associated with the higher priority user will be executed.

For example, there might be a parent user and a child user. If both of them are telling the smart home system to adjust the AC to different values, then the parent user will have priority over the child user. Note that the smart home system needs to be configured to identify users by their voice.

Figure 3:
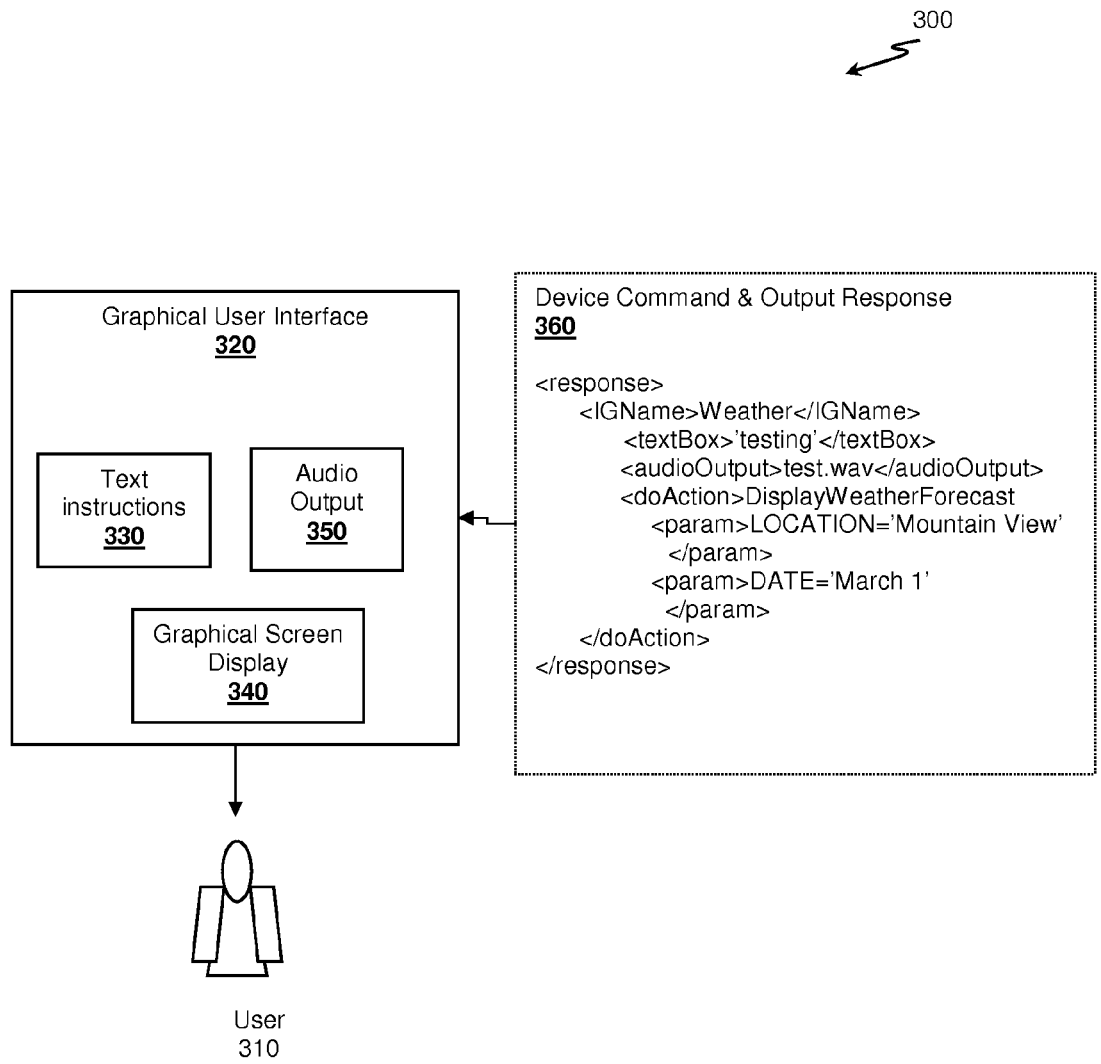
FIG. 3 provides an example of a graphical user interface for displaying a response created by an interaction system.

FIG. 3 displays an example how a device output is assembled during an interaction with the user 310. The device command module 135 (see FIG. 1) assembles a device command 360 that contains a XML representation of all data elements that need to be displayed on the device output screen. In most instances the output will comprise of these three components: Text instructions 330, a corresponding audio output 350 and graphical screen display instructions 340 such as for example displaying a weight loss chart or weather forecast graphics. Note that whether all three output modalities are being displayed or executed and in which form they are being displayed depends on the output device. Obviously, a voice only output device would ignore the text 330 or graphical instructions 340, a small multi-line screen display might only contain the text 330 output and so forth. It is the device interface 180 from FIG. 1 that manages the output for different device and thus makes the multi-modal dialog interaction engine device independent.

Figure 4:
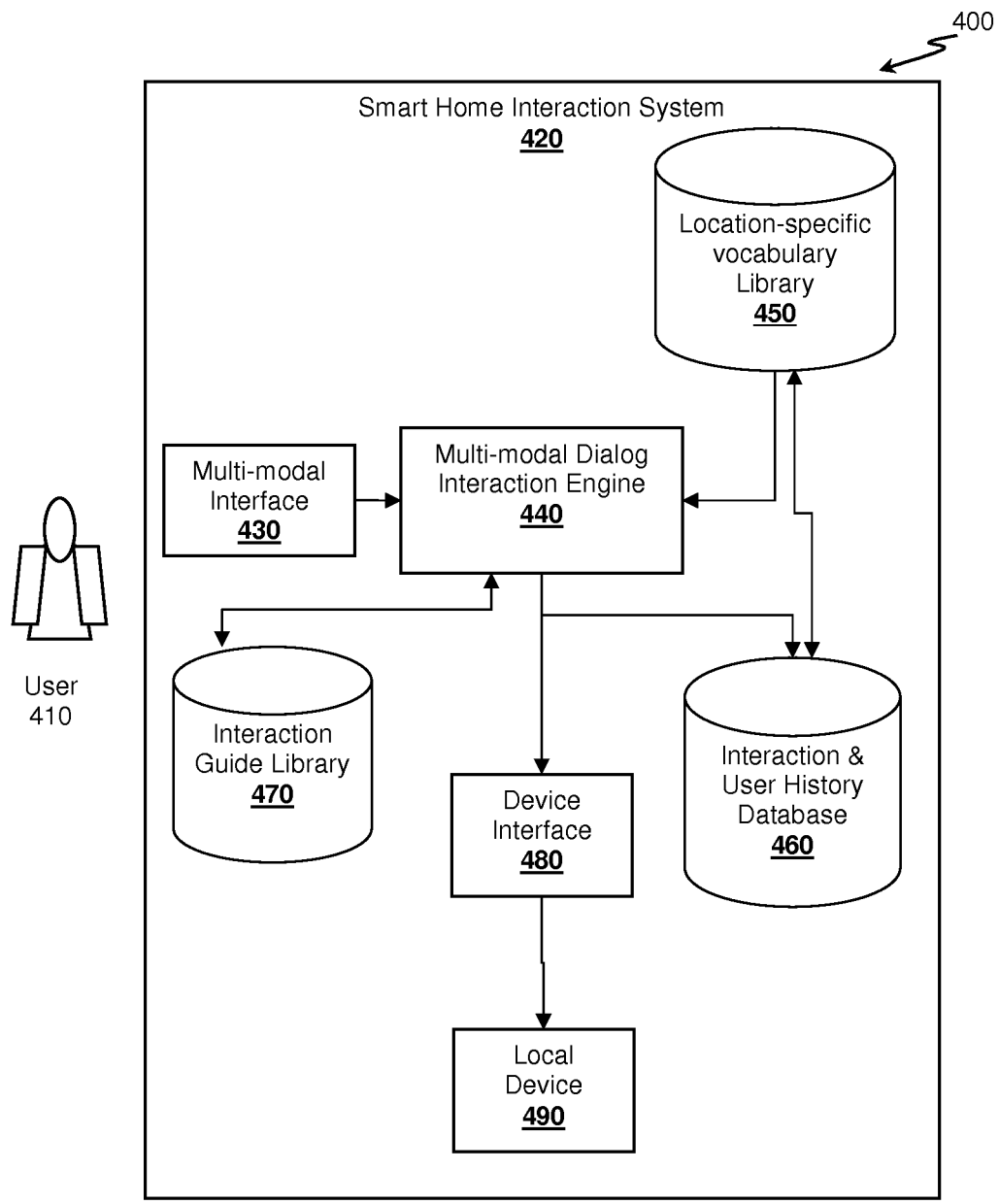
FIG. 4 illustrates the interaction between a multi-modal dialog interaction engine and three data sources within a smart home automation system: location-specific vocabulary, interaction guide library and interaction & user history.

An important aspect of the inventive matter presented here is the adaptive learning ability. FIG. 4 depicts its place in the overall system. Each time the user 410 performs a new interaction via the multi-modal interface 430 and the multi-modal dialog interaction engine 440, the resulting data is being logged in the interaction and user history database 460. Additionally, the interaction guide library 470 contains a set of interaction rule objects that contains rules to periodically, for example daily, to review if there are any new interaction patterns or preferences based on recently performed interactions. If one of these interaction guides finds a match, the new information might or might not be confirmed with the user via configuring the device interface 480 and subsequently the local device 490. Whether a new pattern is confirmed depends on the configuration of the matching interaction rules. If new information does not need to be confirmed or after being confirmed by the user 410, the location specific vocabulary library 450 will be updated with new vocabulary related to a user's preferences.

Note also that the interaction and user history database 460 tracks an interaction history specific to a user. That is the smart home agent system has the capability to identify its users either via voice biometrics, iris scan, fingerprint or simple user ID/password login. This would be handle via an identification interaction rule object and integration with identification sensors such as an iris or fingerprint scanner.

The dialog above in paragraph [0042] provides several examples of the information that the system can learn. For instance, the system maintains a database of take-out services the user has used in the past. This list serves as a menu of possibilities for this user. The system also maintains a database of the items on each restaurant's menu and a list of what the user has historically ordered at each restaurant. The restaurant preferences interaction guide mathematically determines menu preferences for the user based on historical tendencies. When the user specifies a particular pizza restaurant, the system fetches the restaurant interaction guide and its associated interaction rules around the menu and the user's most common menu selection from that menu, asking if the usual was what the user wanted to order. Note that the system might also maintains a record of payment methods and learns which payment method is the most preferred.

Figure 5:
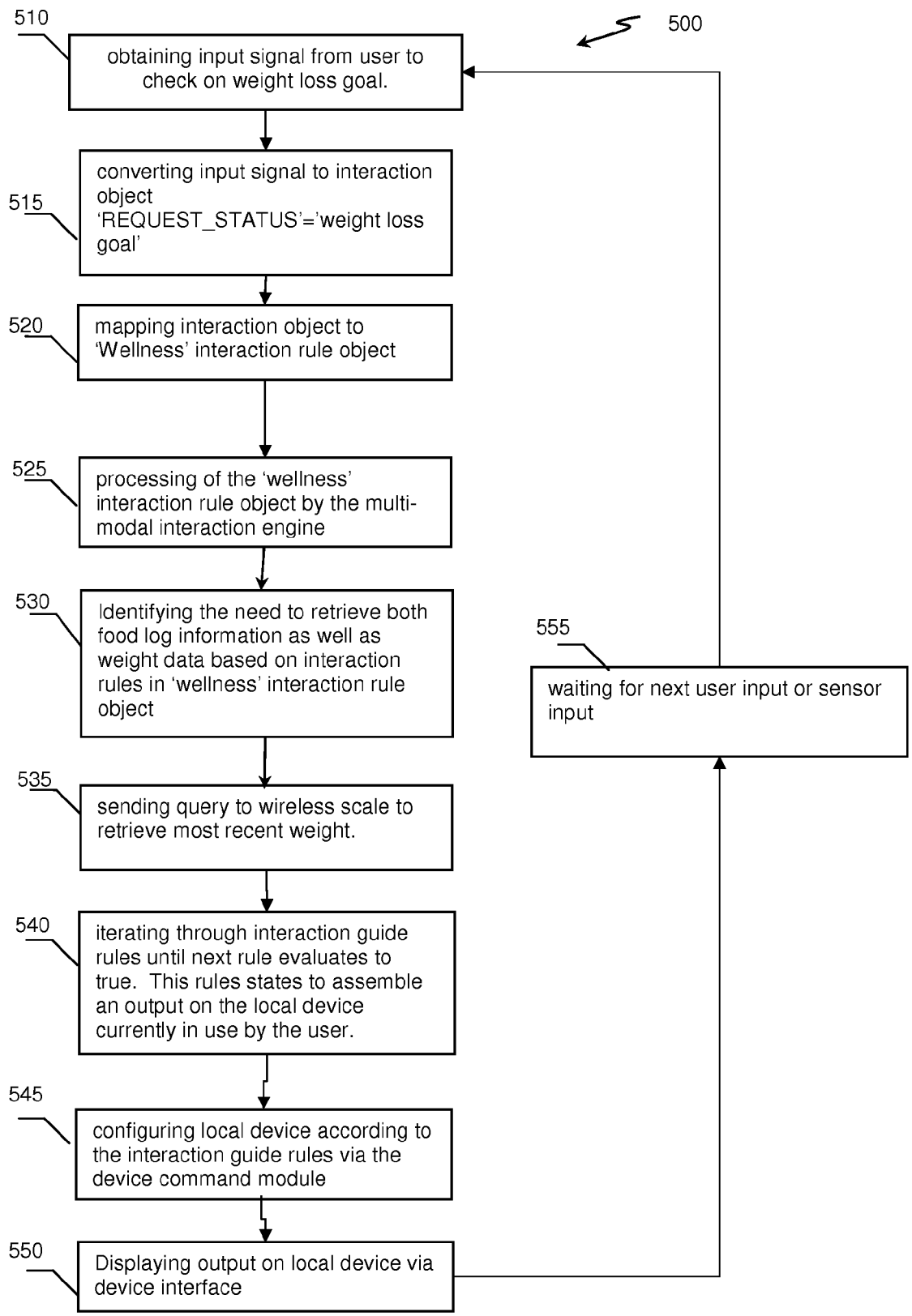
FIG. 5 illustrates a sample of a user's interaction with a smart home automation system regarding the user's wellness; the interaction utilizes sensor data.

FIG. 5 presents an example mixed initiative process flow of a user interacting with the system. A user might request the status on his weight loss goal from the smart home agent system 510. The location specific vocabulary maps this input signal to an interaction object such as 'REQUEST_STATUS'='weight loss goal' 515. This is mapped to the 'Wellness' interaction rule object 520. Consequently the multi-modal dialog interaction engine begins processing this interaction rule object 525. The interaction guide rules that contain instructions to retrieve weight data evaluate to true 530 and a request is sent to the wireless scale sensor to retrieve most recent weight information 535. This request represent a system-initiative, hence it is a mixed initiative system. After obtaining the weight information the multi-modal dialog interaction engine again iterates through the currently active interaction guide to find next interaction guide rules that evaluate to true. This time it is the rules to assemble a device output 540. The device command module assembles the appropriate output 545, and the device interface manages the display on the correct output device 550. Then the system transitions to a wait mode until new input is received from the user (or one of the sensors) 555.

Example embodiments of the inventive matter can be considered to fall into a number of categories. Several example categories are listed below and illustrative example spoken inputs are provided to further explain the scope of the smart home automation agent system. Note that the example inputs can take the form of a simple command or be component responses in a multi-modal conversational dialog interaction.

Note that the system's interaction guide library is composed of one or more interaction guides for different types of functionality. Each interaction guide has its own interaction guide rules that support the control of devices or functions by the user through conversational dialog. This is an important distinction of the inventive matter: regardless of the number of interaction guides or interaction objects in the system, there is only the single seamless user interface of conversational dialog.

The first category is the convenience home automation category. This category includes the control of household systems and implies the presence of special interaction rule objects that support this functionality. The systems can be controlled by the user whether the user is present in the house or remotely by contacting the agent from afar. For instance, the user could tell the agent, "Turn on the driveway light" from within the house or from another city using a telephone or other communicating device. Note that this category also entails interaction rule objects to schedule the control of household devices or systems. For example, "Lower the air conditioner to 72 at ten o'clock" would trigger an interaction object:

HOME_CONTROL_DEVICE=' air_conditioner',
TARGET_TEMPERATURE=72 F
ADJUSTMENT_TIME=10 pm This interaction object would match the 'home control' interaction rule object that in turn contains rules for adjusting a device at a certain time. The respective interaction guide rule would also contain a message to the user to confirm the execution or schedule execution of the user's input signal. Additionally, the user input will be stored in the interaction history so that the inference interaction rule object can learn to perform similar adjustments in the future without the user initiating the command. Control would be extended over any device that is interfaced with the smart home automation agent. Other interaction rules could include handling for: "Turn the air conditioner off"; "Make sure the heat is set to 78 in grandmother's room"; "Dim the lights in the dining room"; "Run the dishwasher at midnight"; "Run the laundry machine after the drier has finished its last cycle"; "Turn on the backyard sprinkler system at five AM for 30 minutes on Mondays and Thursdays"; "Don't turn on the sprinkler system if it is already raining"; "Draw the curtains in the living room"; "Turn on the porch fan"; "Turn on the fireplace in the bedroom and draw me a hot bath"; and "Lower the freezer temperature to 30 degrees". Additionally domestic robots or domotics could also be controlled: "Vacuum the den".

The second category is the entertainment home automation category. This category implies the presence of interaction rule objects for the complete control of televisions and other home entertainment devices. This category includes the control of entertainment systems found in the household. Users can also interact with remotely as well depending on the type of input signals used. Examples could include: "Play Mozart's Concerto For Clarinet And Orchestra In A"; "Bring up Google"; "Download the movie Casablanca"; "Find some reviews of Franco's Pizza"; or "Find out when The King's Speech is playing". Note that the smart home automation agent could completely control all functionality of a television system, eliminating the need for the traditional remote control device by having a television interaction rule object and location specific vocabulary as well as interaction objects. For example: "Go to channel 1323"; "What's on Turner Classic tonight?" or "Record all Frasier episodes that haven't been recorded before". These examples also imply the presence of a television or entertainment center control module capable of responding to the natural language input.

The third category is the communication home automation category. This category includes the control of communication devices found in the household such as telephones, email systems, text systems and the Internet. It also implies the presence of specialized modules that support this functionality. The systems may also be controlled or scheduled remotely. Example phrases could include: "Get Franco's Pizza on the phone"; "Send directions to Franco's Pizza to my cell phone"; "Text my daughters to meet me at Franco's Pizza at 7:30"; or "Email the whole family that the reunion will be on October the 20". Note that the smart home system could also serve as an intelligent call screener and answering machine. Intercepting incoming calls before they ring, the system would ask who the caller who they would like to reach. If the caller could not specify a valid member of the household by name, the system would offer to take a message. If the caller could specify a household member, the system would request and record the caller's name and put the caller on hold while paging the household member. Note that these all function that heavily depend on the existence of the location specific vocabulary library for location specific knowledge context. Upon locating the household member, the system would play the recorded name of the caller and ask them if they would like to take the call. If the household member said "yes", the system would connect the calls. Otherwise, the system would return to the caller and offer to take a message. Such a component of the system could also be scheduled: "I'm tired. No calls after 10:00 pm".

An additional role for the system would be to answer the doorbell. For example, when the house doorbell is rung, the system could address the person at the door through a two way intercom system. Depending upon the person's response, the engine would load domain specific interaction guide rules that would drive the conversational dialog. For example, if the person said they were there to see someone in the household, the system would treat the person as a visitor. Just as in the telephone screening capacity, the system would request and record the visitor's name and ask them to wait while the household member is located. Upon locating the household member, the system would play the recorded name of the visitor and ask the household member what they would like to do. Non-visitors would be classified into other groups, each of which has its own domain specific interaction guide rules. For example, a person might identify themselves as a delivery person. The engine would load interaction guide rules specific to that location specific vocabulary and domain and ask appropriate questions or make appropriate decisions for the situation. For example, the system might ask if the package requires a signature and determine that it does not. The system, knowing that no one is currently in the household, might then suggest that the package be left in the garage, open the garage door and close it when the garage movement sensors indicate that the delivery person has left. In cases where the person ringing the doorbell cannot be classified, the system would to take a message.

The fourth category is the safety and security home automation category. This category includes the control of home security devices found in the household such as motion detectors, alarm systems, surveillance cameras, facial recognition software, etc. and it too implies the presence of specialized interaction guides that support this functionality. The systems may also be controlled or scheduled remotely. Example phrases could include: "Arm the house for the night"; "Arm the external system only but not the inside motion detectors while our guests are here"; "Upload any motion detected videos of the back porch to the FTP site tonight"; "Pan the front porch camera to the left"; or "Turn the system off. False alarm". Note that the system would work in tandem with the alarm system and provide the specifics of what triggered an alarm. An example dialog:

System: The back door has been opened. Is this an emergency?
User: No, my daughter just let the dog out.
System: I have detected some sort of motion in the back yard.
User: It's probably just the dog but show me that video feed in my bedroom.
System: All right Note that the system can work with existing home alarm services or be configured to contact law enforcement directly. For example, if an alarm was detected and the homeowner confirmed that the alarm was an emergency, the system could immediately dial 911, connecting the homeowner with the authorities by speakerphone while recording everything that it sees and hears. Note that if utilizing face recognition and voice biometric software, the system could learn to recognize all family members, house workers and frequent visitors. This would enable the system to deal with each individual in personal or specific ways. For example, the system would learn the how each household member prefers to use the security system and adapt its behavior accordingly. The system could additionally therefore recognize unfamiliar persons and load domain specific interaction guide rules for handling this sort of situation.

Note that the system could detect body movements and encode expectations about individuals in the household. For example, the system might detect that an elderly member of the household is lying on a floor and initiate an interaction to determine if they have fallen or whether the person would like to have the system call someone for help. Such features represent a significant advancement in home security technology. For example:

System: You appear to have fallen. Are you all right?
User: No I fell and hurt my back.
System: Would you like me to call for an ambulance?
User: No but do call my daughter on her cell phone.
System: All right One should further appreciate that the smart home automation system is of a mixed-initiative and multi-threaded nature. This means a user can switch between different home automation tasks while performing some particular task. The system will keep track of all active tasks and return to the first uncompleted task when the new task is completed. For example, a user might tell the system to lower a room's temperature while in the middle of the process of ordering a series of television shows to be recorded. When the room temperature task is completed, the system will return the user to the prior task of scheduling the recording of a series of television shows at the exactly the location in the interaction where he or she previously left off.

Another example serves to illustrate the mixed-initiative aspect of the system's interaction engine. A user may initiate a conversational interaction about some television content with the intent of first finding an interesting overnight movie and then telling the system to record it. During this many turn process, the system may intercept a telephone call or react to a door being opened in another part of the household. These events will cause the engine to load domain specific interaction guide rules that would drive these off-task conversational dialogs before returning to the task at hand.

Moreover, the multi-modal interaction engine can handle many different types of input at a given time as long as the input is relevant to or concerns the current task. This is a distinction to the current-state-of-the-art where home automation systems have only a limited set of possible control inputs at any given moment in time. For example, the system might alert the user that it sensed motion in the garage while the user was using his smartphone. The user might react by manually opening the garage camera's viewer on the smartphone, seeing an intruder and subsequently asking the system to call the police. Available control systems are uni-modal and often complicated to use. In the smart home automation system, preferences need only to be stated and the system will affect all of the underlying changes. FIG. 2 illustrates the overall architecture.

Although the inventive subject matter is presented in the context of home automation, one should appreciate that the inventive subject matter can be applied to other specific locations beyond the home. For example, the location or domain specific libraries can be constructed for a building, an office, a room, a store, a public place (e.g., bus stop, airport, train station, etc.), or other locations.

Many of the techniques disclosed above build upon the applicant's existing technology base as discussed in the following co-owned applications:

U.S. provisional application 61/588,811 titled "Self-Learning, Context Aware Virtual Assistants, Systems And Methods" filed on Jan. 20, 2012.

U.S. provisional application 61/599,054 titled "Multi-Dimensional Interactions and Recall" filed on Feb. 15, 2012.

U.S. provisional application 61/604,873 titled "Spoken Control for User Construction of Complex Behaviors" filed on Feb. 29, 2012.

U.S. provisional application 61/635,553 titled "Mechanical Turk Integrated IDE" filed on Apr. 19, 2012.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms the terms "coupled to" and "coupled with" are also used within a networking context to represent "communicatively coupled with" where two networked elements are able to communicate with each other over a network, possible via one or more intermediary device.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A building-specific device interaction method comprising:
   obtaining, by a dialog interaction engine, input signals from a multi-modal interface;
   retrieving, by the dialog interaction engine, a building-specific location vocabulary associated with a building;
   identifying, by the dialog interaction engine, based on the input signals at least one domain specific vocabulary library having a vocabulary relevant to a specific domain;
   converting, by the dialog interaction engine, the input signals into a query by mapping the input signals to an interaction object using at least one of the building-specific location vocabulary library and the domain specific vocabulary, the query comprising a digital representation of a semantic meaning of the input signal;
   retrieving, by the dialog interaction engine, at least one interaction rule object from an interaction guide library in response to submitting the query to an interaction guide library;
   generating at least one device command from the at least one interaction rule object and from the input signals; and
   configuring, by the dialog interaction engine and via a device interface, at least one device to execute the at least one device command.

2. The method of claim 1, further comprising configuring an output device to present a response related to the device command and responsive to the input signals.

3. The method of claim 1, wherein the domain specific vocabulary library comprises a vocabulary relevant to wellness.

4. The method of claim 1, wherein the domain specific vocabulary library includes a vocabulary relevant to a group of people.

5. The method of claim 1, wherein the domain specific vocabulary library includes a vocabulary relevant to an identity of a person.

6. The method of claim 1, wherein the building-specific location vocabulary library includes a room-specific vocabulary.

7. The method of claim 1, wherein the domain-specific vocabulary includes a room-specific vocabulary.

8. The method of claim 1, wherein the dialog interaction engine comprises a desktop computer.

9. The method of claim 1, wherein the dialog interaction engine comprises a portable device.

10. The method of claim 9, wherein the portable device comprises a smart phone.

11. The method of claim 1, further comprising, receiving, by the dialog interaction engine, the input signals from at least one of the following sensors: a camera, a thermometer, a precipitation sensor, a medical sensor, a microphone, a proximity sensor, an accelerometer, and an optical sensor.

12. The method of claim 1, further comprising detecting spoken words in the input signal.

13. The method of claim 1, wherein the step of retrieving the at least one interaction objects depend on detected changes in the environment based on the input signals.

14. The method of claim 1, wherein interaction rule objects comprises device interaction rules.

15. The method of claim 14, further comprising populating a device command template within the device interaction rules based on parameters derived from the input signals.

16. The method of claim 14, further comprising iterating through the device interaction rules by evaluating the device interaction rules.

17. The method of claim 16, wherein the step of generating the at least one device command includes generate the at least one device command from the device interaction rules that evaluates to true.

18. The method of claim 17, further comprising generating the at least one device command from a first device interaction rules that evaluates to true.

19. The method of claim 1, wherein the at least one device is local to the building.

* * * * *